Patented Oct. 26, 1926.

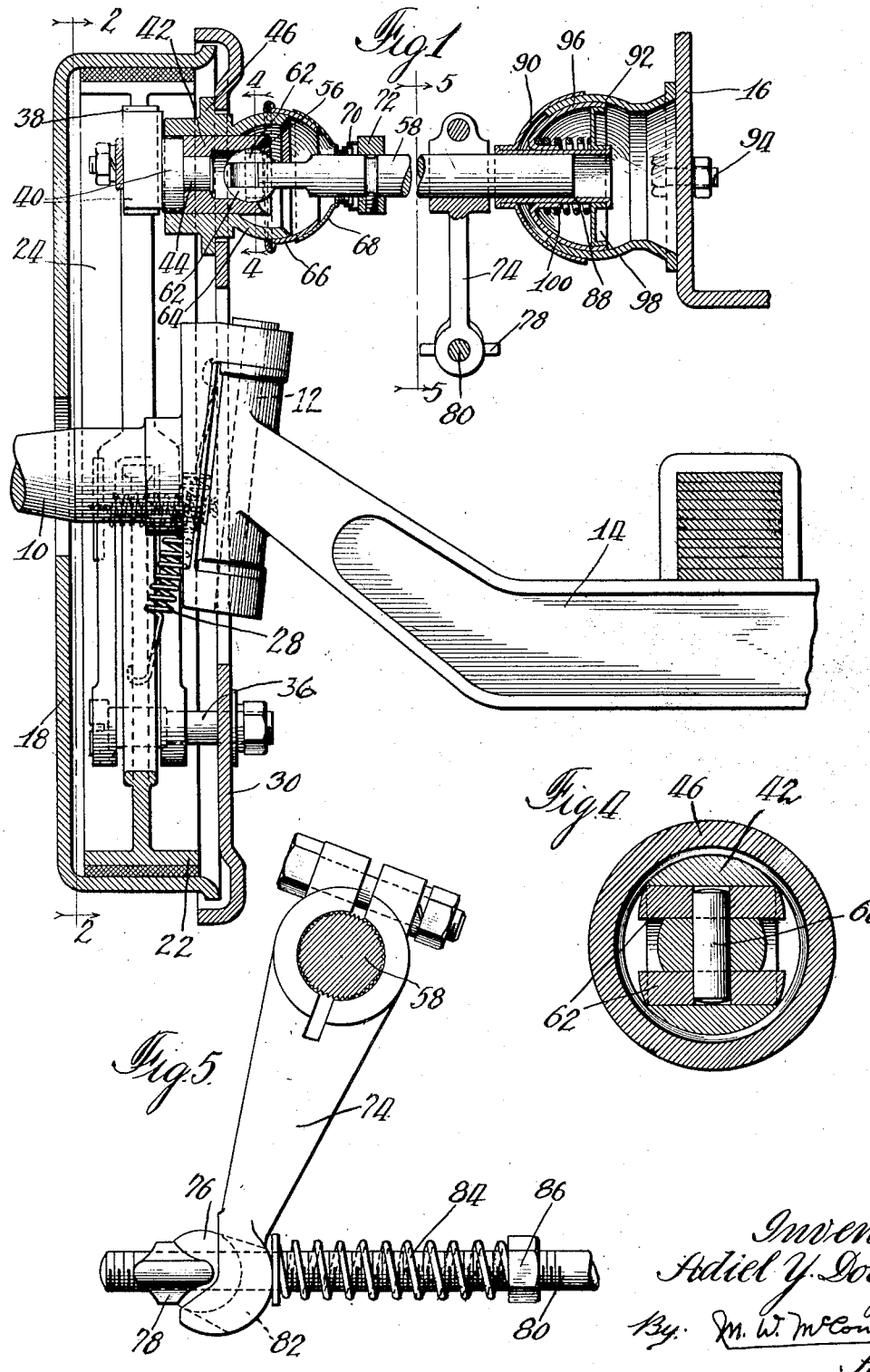

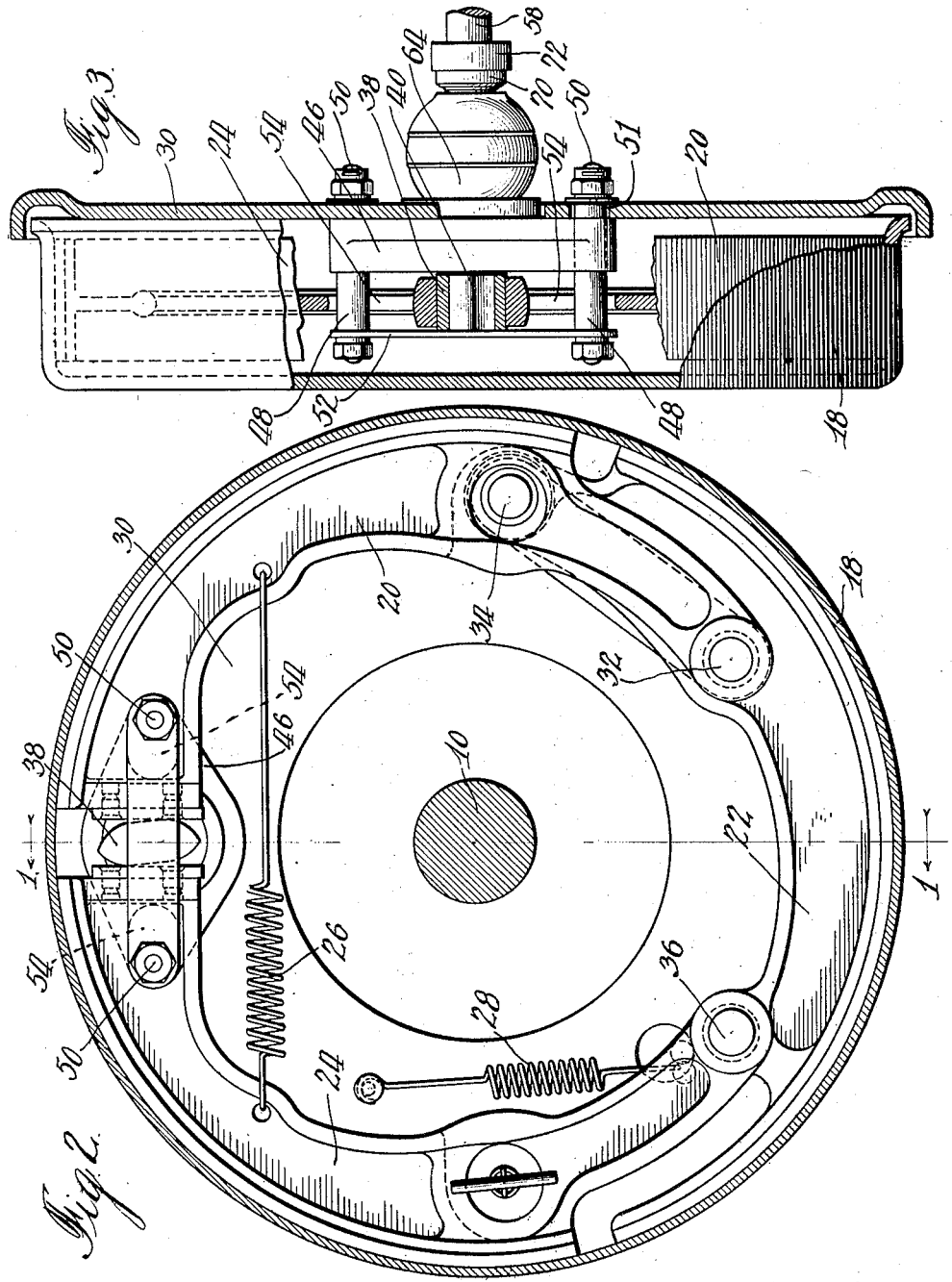

1,604,394

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

FRONT-WHEEL BRAKE.

Application filed March 28, 1925. Serial No. 18,987.

This invention relates to brakes, and is illustrated as embodied in an automobile chassis having front wheel brakes. An object of the invention is to provide efficient but inexpensive control mechanism for the brakes, by utilizing as far as possible simple parts which can be stamped out or made by automatic machines.

Various features of the invention relate to supporting the chassis end of the operating shaft with a novel joint carried by the chassis frame, the joint preferably including novel spherical parts held together by a spring housed within the joint; to connecting the shaft to the brake-applying device by a novel universal joint housed within one end of one of the shafts having a cross bore to receive it; to a novel adjustable connection to the link from the pedal connections; and to a novel mounting of the parts adjacent the cam.

These and other features, including various novel combinations of parts and desirable particular constructions, will be apparent from the following description of one illustrative embodiment of the invention shown in the accompanying drawings, in which:

Figure 1 is a vertical transverse section through one front wheel brake and associated parts;

Figure 2 is a vertical section on the line 2—2 of Figure 1, showing the brake shoes in side elevation;

Figure 3 is a top plan view of the brake, partly broken away to show the cam arrangement;

Figure 4 is a vertical section through the universal joint above the king pin, on the line 4—4 of Figure 1; and Figure 5 is a vertical section on the line 5—5 of Figure 1, showing in side elevation the arm on the operating shaft.

In the arrangement selected for illustration, the brake acts on a front wheel rotatably mounted on a knuckle 10 swivelled by a king pin 12 on the end of an axle 14 supporting a chassis frame 16.

The brake includes a drum 18, within which are arranged a plurality of shoes 20, 22, and 24, normally held away from the drum by springs 26 and 28. Shoe 20, which is bifurcated at its end, is anchored to a stationary backing plate 30 by a pivot 32 passing through a relatively large opening in shoe 22, and shoe 22 is anchored by a pivot 34 passing through a relatively large opening in shoe 20. Shoe 24 is pivoted to shoe 22 at 36.

The shoes are shown expanded by a device such as a cam 38 having a shorter bottom lobe engaging shoe 20, and a longer upper lobe engaging shoe 24, since the end of shoe 24 has approximately twice as much movement as the end of shoe 20. Cam 38 is secured to, or integral with, a member 40 fitting into a key slot in the end of a hollow camshaft 42, and having a stem 44 extending through the camshaft and riveted over on the inside.

Except as further described below, the above-mentioned parts may be of any desired construction, as it is not my intention to claim the shoes and their arrangement in the present application, this subject-matter having heretofore been claimed in a number of prior pending applications.

The camshaft 42 is journaled in a cylindrical bore in a bearing or support 46 having laterally-extending wings carrying posts 48, which may be integral therewith or in the form of separate sleeves held by bolts 50. Bolts 50 are threaded to receive nuts at one or both ends to secure support 46 to the backing plate and to secure to the tops of posts 48 a plate 52 passing across the end of cam 38, strengthening the assembly and, with support 46, confining the ends of the brake shoes laterally. Posts 48 pass through slots 54 in the ends of the brake shoes.

Preferably the bolts 50, or the posts or sleeves 48 through which the bolts pass, are arranged in elongated slots 51 in the backing plate 30. When the nuts on the right hand ends (Figure 3) are not drawn up too tight, the very considerable force used in applying the brakes is sufficient to cause the support 46, with the cam and camshaft, to shift slightly laterally so that the cam automatically centers itself exactly between the shoes. The nuts may then be tightened to preserve this adjustment, but I prefer to leave them loose enough so that the cam reactions may constantly and automatically correct the centering, to allow for any uneven wear of brake linings, etc.

The inner end of the camshaft 42 is bored out conically or spherically at 56, to give as much play as possible to an operating shaft 58, having its end rounded and flattened and swivelled by a pin 60 between two members 62 having inner flat surfaces engaging the flattened end of the shaft, and having cylindrical outer surfaces journaled in a normally horizontal cross bore or bearing in the end of the camshaft 42. When assembled, as in the drawings, the wall of the bore in support 46 prevents axial displacement of members 62, and the wall of the cross bore in the camshaft 42 prevents axial displacement of pin 60. As will be recognized by those skilled in the art, since the axis of pin 60 intersects at an acute angle the axis of the kingpin 12, the outer front brake will automatically be released in rounding a corner.

Support 46 is formed with a generally hemispherical part 64, having its center substantially at the universal joint described above. A pair of slidably-engaging sheet metal members 66 and 68 carried by shaft 58, and held by a spring 70 confined by a collar or stop 72, complete the inclosure of the universal joint, and, with part 64, form a lubricant-tight casing.

The operating shaft 58 is fluted to be embraced by a split clamp formed on the end of an arm 74, thus providing for angular adjustment of the arm by loosening the clamp. The bottom of the arm is formed with a spherical socket or seat for a member 76, which may be integral with, or backed by, a nut 78 threaded on a link 80 operated by the pedal connections and passing through an opening 82 intersecting the seat for member 76. Adjustment is facilitated by holding arm 74 against member 76 by a coil spring 84 sleeved on the link and confined by a stop, shown as a nut 86 adjustably threaded on the link.

The inner end of shaft 58 is slidably received in a sleeve 88, spun over at its outer end to form a flange engaging an outwardly-extending tubular flange on a stamped hemispherical member 90 slidably engaging the outer surface of a stationary generally hemispherical member 92 having a base flange secured to the chassis frame 16 by bolts 94. If desired, a gasket may be placed between member 92 and the chassis frame, to make a lubricant-tight joint.

Sleeve 88 is also embraced by an inwardly-extending tubular flange formed on an inner hemispherical stamped member 96, slidably engaging the inner surface of member 92. Member 96 is a little too large to be inserted undistorted in member 92, which extends some distance beyond 180°, and is slit at its edge so that it may be contrated for insertion therein.

The inner end of sleeve 88 is spun over to form a flange holding a member such as a diaphragm 98, the whole being held resiliently together by a coil spring 100 confined between member 98 and member 96.

Thus spring 100 acts directly on member 96, and indirectly on member 90 through sleeve 88, to hold them slidably against the inner and outer surfaces of member 92. Diaphragm 92 also prevents any contraction of member 96 when in place.

While one illustrative embodiment of the invention has been described in detail, it is not my intention to limit its scope to that particular embodiment, or otherwise than by the terms of the appended claims.

I claim:

1. Operating mechanism for a brake acting on a wheel rotatably mounted on a knuckle swivelled by a king pin to one end of an axle supporting a chassis frame, said mechanism comprising, in combination, a shaft having a universal joint above the king pin and brake-operating means operated by the shaft, means for rocking the shaft to apply the brake, and a support for the inner end of the shaft carried by the chassis frame on its outer side and including fixed and movable generally hemispherical members constituting a universal joint, the fixed member being secured to the frame and the movable member supporting the shaft in a manner permitting axial movement, and a spring housed within the fixed member and holding said members yieldingly in sliding engagement with each other.

2. Operating mechanism for a brake acting on a wheel rotatably mounted on a knuckle swivelled by a king pin to one end of an axle supporting a chassis frame, said mechanism comprising, in combination, a shaft having a universal joint above the king pin and brake-operating means operated by the shaft, means for rocking the shaft to apply the brake, and a support for the inner end of the shaft carried by the chassis frame and including a fixed generally hemispherical member secured at its base to the chassis frame, inner and outer movable hemispherical members supporting the end of the shaft and a single spring housed within the fixed member and clamping said members respectively against the inside and outside of the first hemispherical member.

3. Mechanism as defined by claim 2, in which the movable hemispherical members are stampings, and carry a separate sleeve slidably receiving the end of the shaft.

4. Mechanism as defined by claim 2, in which the movable members carry a sleeve having a part engaging the outer hemispherical member and a stop within the inner hemispherical member, and the spring is confined between the stop and the inner hemispherical member.

5. Mechanism as defined by claim 2, in which the inner and outer hemispherical members are formed respectively with inwardly and outwardly turned tubular flanges in combination with a shaft-supporting sleeve embraced by said flanges.

6. Operating mechanism for a brake acting on a wheel rotatably mounted on a knuckle swivelled by a king pin to one end of an axle, said mechanism comprising, in combination, a shaft, a brake-operating device, a shaft supported by the knuckle and operating said device and normally in alinement with the first shaft, the end of one of the shafts having a cylindrical cross bore substantially in alinement with the king pin and the adjacent end of the other shaft being flattened and extending into the cross bore, a pair of members having flat inner surfaces embracing the flattened shaft end and having cylindrical outer surfaces fitting the cross bore, and means pivoting the flattened shaft end between the said members.

7. Mechanism as defined by claim 6 in combination with a bearing for the second shaft, and in which the cross bore is formed in the end of the second shaft and is blocked at its ends by the inner wall of the bearing to retain the pair of members embracing the flattened end of the first shaft.

8. Operating mechanism for a brake acting on a wheel rotatably mounted on a knuckle swivelled by a king pin to one end of an axle supporting a chassis frame, said mechanism comprising, in combination, a brake-operating device and a shaft universally connected thereto substantially in line with the king pin, an operating arm secured to the shaft at one end and formed with a spherical socket seat at the other end and with an opening intersecting said seat, an operating link having a threaded end extending through said opening, an adjustable device threaded on the end of the link and having a spherical base seated in the spherical seat in the arm, a stop on the link on the opposite side of the arm, and a coil spring sleeved on the link and confined between the arm and said stop.

9. Mechanism as defined by claim 8, in which said arm is angularly adjustable on the shaft.

10. Operating mechanism for a brake acting on a wheel rotatably mounted on a knuckle swivelled by a king pin to one end of an axle supporting a chassis frame, said mechanism comprising, in combination, a brake-applying device, a shaft bearing carried by the knuckle, a shaft in said bearing operating said device and an operating shaft normally in alinement therewith and floating for movement across its axis and universally connected to the first shaft substantially in the king pin axis, the shaft bearing having a generally hemispherical part terminating approximately in a diametric plane and partly inclosing the connection between the two shafts and having its outer surface curved about a center substantially at the connection, sheet metal generally spherical members carried by the operating shaft and held slidably engaging the outer curved surface of said hemispherical part and with said part inclosing said connection, and means on the operating shaft holding said members.

11. Operating mechanism for a brake including a plurality of shoes, comprising, in combination, an operating cam between the free ends of the shoes, the shoes having lining-supporting cylindrical outer portions and inwardly-extending webs formed with slots adjacent the free ends on opposite sides of the cam, a stationary support, posts extending through said slots and secured to the support, and a plate carried by the posts and passing across the end of the cam, the shoes having parts fitting between the plate and support to be held against lateral movement.

12. Brake-operating mechanism comprising, in combination, a backing plate having elongated openings, a support having parts passing through the openings and clamped to the plate to be normally stationary but shiftable on the application of considerable force, and a brake-operating device carried by the support and operating to shift the support when the brakes are applied to center itself as described.

13. Brake-operating mechanism comprising, in combination, a brake-operating device, a support therefor shiftable by the reaction of the brake-applying force in such a manner as to center said device and means to hold the support when the brakes are released in the position to which it was shifted by applying the brakes.

14. A brake comprising, in combination, movable shoes, a brake-operating device engaging adjacent ends of the shoes, a rockshaft for operating said device, a support having a bearing for the rockshaft, and means to clamp the support stationarily in place lightly enough to permit it to shift laterally to center said device with respect to the shoes.

15. Operating mechanism for front wheel brakes comprising, in combination, a brake-applying shaft 42 having a cylindrical cross bore in its end, an operating shaft 58 extending into the bore, and a connecting device 62 pivotally connected to the operating shaft 58 and fitting into the cylindrical cross bore in the brake-applying shaft 42.

16. Operating mechanism for front wheel brakes comprising, in combination, a brake-applying shaft 42 having a cylindrical cross bore in its end, an operating shaft 58 extending into the bore, a connecting device 62 pivotally connected to the operating shaft 58 and fitting into the cylindrical cross bore in the brake-applying shaft 42, and a support 46 formed with a bearing for the brake-applying shaft 42 and blocking the ends of said cross bore.

17. Brake-operating mechanism comprising, in combination, a shaft 42 having a slot in its end and an axial opening, and a cam 40 having a key portion in said slot and an axial part 44 projecting into the opening.

18. Operating means for a brake on a swivelled wheel comprising, in combination, a brake-applying device swivelling with the shaft, an operating shaft, a universal joint connecting the shaft and said device and arranged substantially in the swivelling axis of the wheel, and means to clamp the device lightly in place and normally preventing shifting therof, but yieldable to permit such shifting about the universal joint to center the brake-applying device under the reactive force from the shaft.

19. Operating means for a brake on a swivelled wheel, the brake including anchored shoes having adjacent separable unanchored ends, and comprising, in combination with said brake, a brake-applying device engaging the ends of the shoes and shiftable laterally to center itself between said ends, an operating part, and universally movable means through which said part operates the device and arranged when the brake is applied in the swivelling axis of the wheel, the said means having the double function of permitting the swivelling of the wheel and of permitting the shifting of said device.

In testimony whereof I have hereunto signed my name.

ADIEL Y. DODGE.